Feb. 21, 1928.  1,659,966

E. D. TILLYER

BIFOCAL LENS

Filed April 12, 1926

Inventor

Edgar D. Tillyer.

By Harry H. Styll.

Attorney

Patented Feb. 21, 1928.

1,659,966

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

BIFOCAL LENS.

Application filed April 12, 1926. Serial No. 101,434.

This invention relates to bifocal lenses and has more particular reference to a fused bifocal lens wherein provision is made to neutralize the astigmatism through the reading portion of the major lens as well as through the minor lens.

The principal object of this invention is to provide means by which the astigmatism inherent in the major blank of a fused bifocal lens is compensated and neutralized at the same time the astigmatism in the fused reading segment is neutralized and, compensated.

Other objects and advantages of the invention will become apparent from the following specification taken in connection with the accompanying drawings, and it will be understood that I may make any modifications in the construction and arrangement of parts without departing from the spirit of the invention as set forth in the appended claims, and I, therefore, do not wish to be limited to the exact arrangements shown. The preferred form only of the invention has been shown by way of illustration.

Referring to the drawings in which similar characters of reference are employed to denote corresponding parts throughout:

Figure 1:
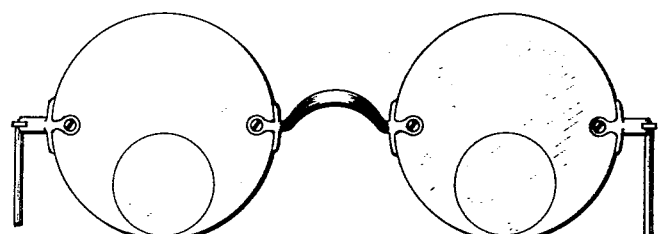
Figure 1 is a front view of a pair of spectacles embodying the invention.
Figure 2:
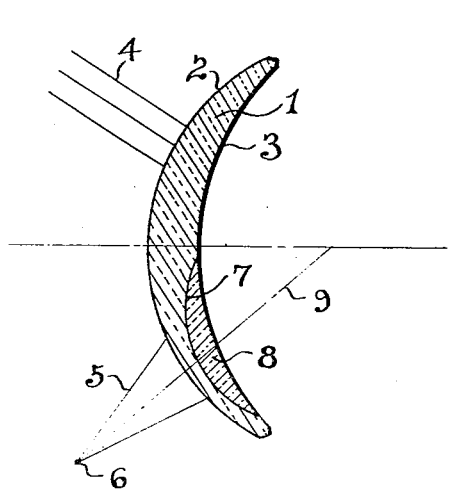
Figure 2 is a cross section on line 2—2 of Figure 3.
Figure 3:
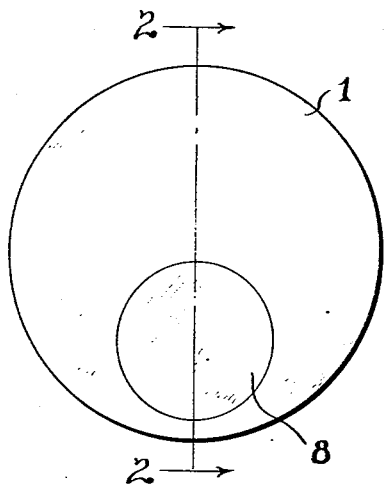
Figure 3 is a front or plan view of a bifocal lens embodying the invention.

In making my bifocal lens I provide a major blank 1 of one index of refraction which I provide with the surfaces 2 and 3 to provide the best shape for desired correction of oblique pencils of rays coming from a distant object indicated at 4 in Figure 2. It will be seen that this is not the best shape for pencils of rays from near by reading objects as shown at 5, Figure 2, because these rays converge to a point 6. It is, therefore, clear that these rays or pencils will require a different shape lens from that required for the distance portion, and that as the surfaces 2 and 3 have been put on the lens there will be an astigmatism through the reading portion of the lens due to the shape of the distance blank 1.

I next grind a countersink 7 in the surface 3 of the major blank 1 and fuse or otherwise secure in the countersink 7 the minor lens 8 of a different index of refraction from that of the major lens 1. The surface 7 of the countersink if spherical will also have an inherent astigmatism due to the oblique vision which is had through the reading portion, as indicated by the line 9, Figure 2. Therefore, it will be seen that through the reading portion of the composite blanks 1 and 8 I have two astigmatic errors, one due to the shape of the curves on the blank 1 and the other due to the countersunk segment 8.

It is the object of my invention to neutralize these two astigmatisms and it may be done in any one of three different ways. The composite astigmatism, of course, will be found on some particular meridian through the reading portion. Now, I can compensate for this compound astigmatism by grinding the countersink 7 to a toric shape instead of to a spherical shape having the excess astigmatism on the desired meridian to neutralize the inherent astigmatism of the segment as well as of the shape of the major blank, or I may make my countersink 7 a spherical curve and fuse the segment 8 therein and then bend the lens over a toric block while the lens is heated to a point of plasticity so that the countersink 7 is stretched in bending to a toric form having one meridian changed to an amount to compensate the composite astigmatism heretofore referred to, or I may grind the surface 3 over my major and minor blanks 1 and 8 to a toric shape having the excess in one meridian sufficient to compensate the composite astigmatism aforesaid and grind on the other face 2 of the lens another toric curve which shall be so positioned that its excess in one meridian will compensate the excess that has been placed on the other side through the distance field of the lens. Any one of these three methods will produce a lens having the best conditions for distance vision and corrected for astigmatism through the reading portion of the lens, not only due to its shape as governed by the distance field, but also to the astigmatism inherent in the countersunk segment 8.

The lenses are made from the usual optical glass or crystals and their surfaces are ground and polished on the usual prior art lens making machines, as likewise are the surfaces of the countersink 7 and the button 8 fused in the countersink 7 in the usual way. One surface 3 is continuous over both the distance and the reading portions of the lens as is usual with the so-called bifocals.

It is clear that I may locate the segment 8 in any desired position with respect to the major blank 1.

From the foregoing it will be apparent that I have provided simple, efficient and inexpensive means of making an ophthalmic bifocal lens having the best condition for distance vision and having the various astigmatisms through the reading portion compensated and corrected.

Having described my invention, I claim:

1. An ophthalmic lens having a major lens portion with lens surfaces on the front and rear sides thereof to produce the required prescriptive power for distant vision, a minor lens portion overlying a part of said major lens portion and surfaced to produce the combination with the major lens portion over which it lies the required prescriptive power for reading vision, said overlying surfaces of the major and minor lens portions having a composite variation in one meridian substantially equal and opposite to the composite astigmatic aberration in said meridian of the overlying major and minor portions of a lens of the same prescriptive power with unvaried surfaces whereby the said astigmatic aberration is substantially neutralized.

2. The process of making an ophthalmic lens having overlying distance and reading fields free from astigmatic aberration in the overlying fields comprising computing the front and rear surfaces of said lens to give the required prescriptive powers of distance and reading vision, computing the composite astigmatic aberration and the meridian thereof through the overlying fields, and surfacing a lens blank with front and rear optical surfaces to give the calculated prescriptive distance and reading powers with a composite variation through the overlying fields substantially equal and opposite to the calculated astigmatic aberration in the said meridian to substantially neutralize said composite astigmatic aberration of the overlying fields.

EDGAR D. TILLYER.